Figure 2:
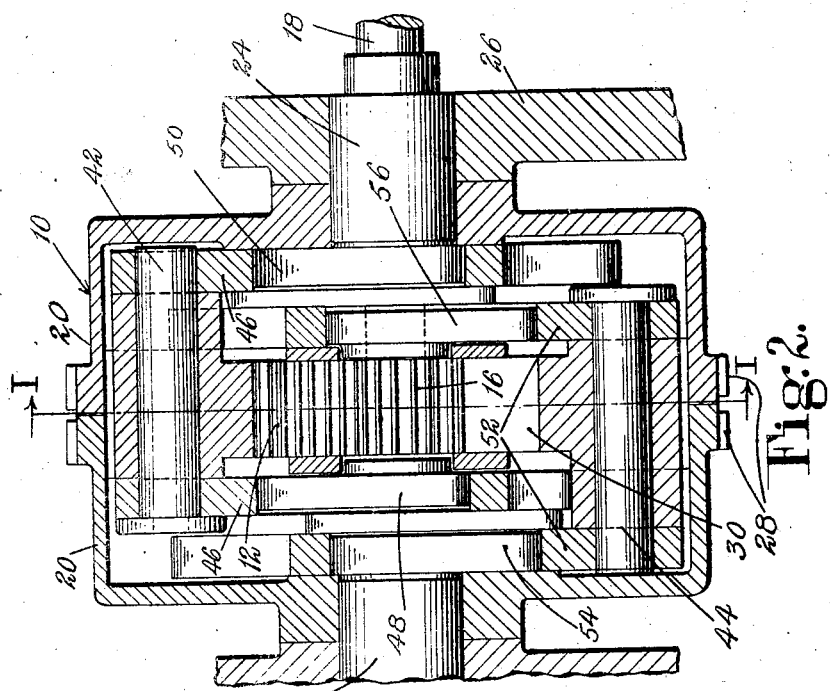

March 16, 1943.    L. E. JAMES    2,314,278
MECHANICAL MOVEMENT
Filed May 31, 1941

INVENTOR
Lester E. James Deceased
By Mary B. James Administratrix
By her attorney Patented Mar. 16, 1943

2,314,278

UNITED STATES PATENT OFFICE 2,314,278

MECHANICAL MOVEMENT

Lester E. James, deceased, late of Swampscott, Mass., by Mary B. James, administratrix, Swampscott, Mass., assignor to United Shoe Machinery Corporation, Flemington, N. J., a corporation of New Jersey Application May 31, 1941, Serial No. 396,047

5 Claims. (Cl. 74—64)

This invention relates to variable speed devices and is herein illustrated as embodied in a mechanical movement for varying the speed of a driven shaft.

In application Serial No. 368,975 filed December 7, 1940, now Patent 2,309,595, in the name of Lester E. James, there is disclosed a mechanical movement comprising a planetary rack mechanism for varying the speed of a driven shaft during each cycle, in such manner that the angular velocity of the shaft varies from zero to a maximum and then back to zero. It is an object of the present invention to provide novel mechanism of the type referred to, in which the parts are so balanced as to reduce wear and vibration to a minimum, thus permitting operation at speeds which otherwise would be excessive.

The illustrated embodiment of the invention comprises a continuously rotating driving member and a driven member, there being racks positioned 180° apart on the driving member and operatively connected to the driven member, together with means for simultaneously shifting the position of the racks relatively to the driven member during rotation of the driving member, thereby to vary the angular velocity of the driven member during each cycle of operation thereof. Preferably, and as shown, the racks are arranged to be driven by a plurality of sets of balanced links, thus to contribute to the smooth operation of the mechanism.

These and other features of the invention are disclosed in the following specification and accompanying drawing, and are set forth in the claims.

Figure 1:
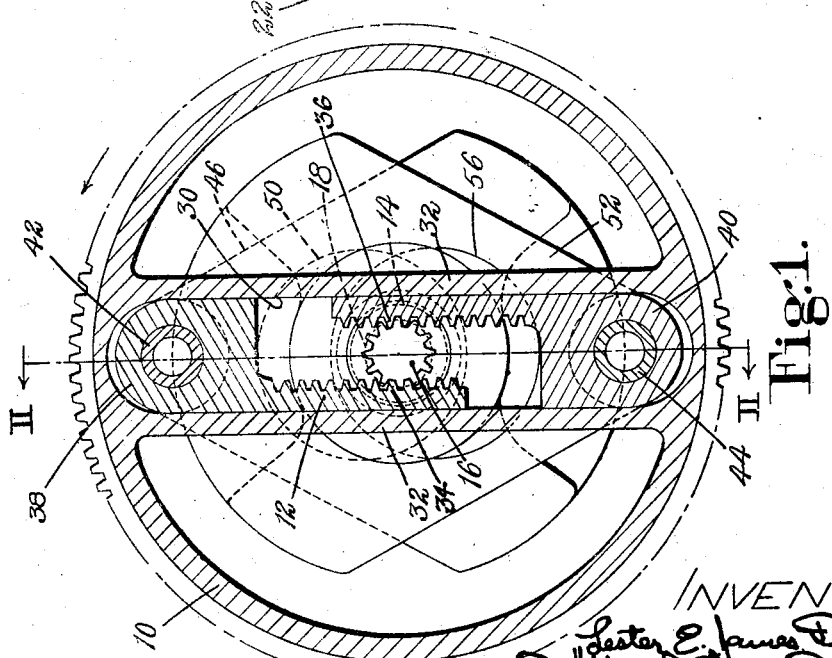

In the drawing,

Fig. 1 is a vertical cross sectional view, taken along the line I—I of Fig. 2, of a mechanical movement constructed in accordance with the invention; and Fig. 2 is a cross sectional view, taken along the line II—II of Fig. 1.

As shown in the drawing, the mechanical movement comprises a driving member 10, having operatively connected thereto racks 12 and 14, arranged to mesh with a gear shown as a pinion 16 carried by a driven shaft 18. The racks 12 and 14 rotate bodily with the driving member 10, and, during rotation, are moved in and out relatively to the axis of the driven shaft 18 by mechanism later to be described, the combination of the two movements being effective to rotate the driven shaft 18 at a variable velocity.

The driving member 10 comprises a cage formed of two hollow cylindrical members 20, mounted for rotation upon studs 22 and 24 carried by a housing 26. The driving member 10 is provided with gear teeth 28, by which it can be continuously driven in any suitable manner.

The racks 12 and 14 are positioned in a guideway or slot 30, formed between two spaced guide walls 32 and extending radially of the cage members 20, substantially centrally of the cage in its assembled condition. The racks have portions 34 and 36, respectively, in mesh with the pinion 16 and extending in opposite directions longitudinally of the slot 30, and are carried by shank portions 38 and 40 which are bored to receive pins 42 and 44, respectively.

The rack 12, during its rotation with the driving member 10, is arranged to be moved radially of the axis of the pinion 16 by links 46, which are in the form of eccentric straps mounted upon a pivot 48 forming an extension of the stud 22, and on a pivot 50 forming part of the stud 24. Similarly, the rack 14 is connected by links 52 to a pivot 54 on the stud 22, and to a pivot 56 on the stud 24. The axes of the pivots 48 and 50 are in alinement with each other and are spaced from the axis of the driven shaft by a distance equal to the radius of the pinion. The axes of the pivots 54 and 56 are in alinement with each other and are spaced from the axis of the driven shaft by a like distance. This arrangement is such that the parts for effecting movement of the pinion 16 are balanced on opposite sides of the axis of the driven shaft, as well as on opposite sides of the guide walls 32 along which the racks slide.

It will be apparent that, as the driving member 10 is rotated, the guide walls 32 will effect rotation of the racks bodily about the axis of the driven member 18, and that due to the action of the links 46 and 52 the racks 12 and 14 will assume different positions along the slot 30. In this connection it is to be noted that the pin 42, upon which the rack 12 is pivoted, will move about the axis of the pivots 48 and 50, whereas the pin 44, to which the rack 14 is connected, will move about the axis of the pivots 54 and 56. Since the axes of the two sets of pivots are spaced equally upon opposite sides of the axis of the driven shaft, the racks 12 and 14, during their bodily movement about the axis of the driven shaft, will be displaced longitudinally of the slot 30 by equal amounts, either inwardly or outwardly of the axis of the driven member, depending upon the angular position of the pins 42 and 44, thus contributing equally to vary the velocity of rotation of the pinion 16.

In the operation of the mechanism, it is contemplated that the driving member 10 be operated continuously at a constant speed in the direction indicated by the arrow in Fig. 1. As the driving member is rotated, if the racks 12 and 14 were not moved along the slot 30 relatively to the axis of the pinion 16, the driving member would be locked to the pinion, which would then be rotated at the same speed as the driving member. However, since the positions of the pins 42 and 44 are varied due to the eccentricity of the axes of rotation of the pins relatively to the axis of the driving member, the racks are moved tangentially of the pinion 16, thus effecting its rotation either at a higher or lower velocity than that of the driving member. The movements of the racks 12 and 14 may be considered as of two kinds: bodily movement of the racks about the axis of the pinion 16, and movement of the racks tangentially of the pinion. The first movement tends to rotate the pinion in a counterclockwise direction, as shown in Fig. 1, at the same angular velocity as the driving member 10. The second movement tends to impart an additional rotation to the pinion, either in the same direction as the driving member, in which case the pinion moves at a higher angular velocity than the driving member, or in a reverse direction, in which case the pinion moves at a lower velocity than the driving member. In the construction illustrated, the eccentricity of the pivots is equal to the radius of the pinion, and the distance of the pins 42 and 44 from the axis of the pinion, when in the position shown in Fig. 1, is taken at six times the radius of the pinion. It is found that during each revolution of the driving member 10, the pinion 16 will rotate once, and during the rotation will vary in velocity from zero, at a point 90° in a clockwise direction from the position shown in Fig. 1; to an angular velocity equal to that of the driving member, in the position of the parts shown in Fig. 1; to a maximum velocity of twice that of the driven member in a position of the parts 90° in a counterclockwise direction from the position shown in Fig. 1; and then back to zero velocity in the first position mentioned.

By providing two oppositely disposed racks which move simultaneously inwardly or outwardly along the guideway tangentially of the pinion, and by driving the racks by two sets of links disposed upon opposite sides of the racks, the parts are substantially in balance during their rotation, thus contributing to the smoothness of operation of the mechanism and reducing the amount of wear of the parts even at high velocities.

Having described the invention, what is claimed as new and desired to be secured by Letters Patent of the United States is:

1. In a mechanical movement, a rotatable driving member, a driven pinion mounted coaxially of the driving member, a guideway formed in the driving member and extending radially thereof, a plurality of racks slidably mounted in the guideway and making engagement with the pinion, a pin carried by each of the racks, pivots positioned eccentrically of the pinion upon opposite sides of the axis thereof, and links connecting the pins and the pivots.

2. In a mechanical movement, a driving gear, a driven gear positioned coaxially of the driving gear, a radially extending guideway forming part of the driving gear and surrounding the driven gear, a plurality of racks slidably mounted in the guideway and having each a pin, a plurality of pivots mounted upon opposite sides of the axis of the driven gear and equally spaced from that axis, and links connecting each of the pivots to one of the pins for producing a variable movement of the racks tangentially of the driven gear during rotation of the driving member about the axis of the driven gear.

3. A mechanical movement comprising a rotary cage having a radially disposed guideway therein, a driven pinion rotated coaxially of the cage, pins positioned in the slot and movable angularly with the cage, racks located in the guideway in mesh with the pinion and connected to the pins upon opposite sides of the axis of the pinion, pivots located upon opposite sides of the axis at equal distances therefrom, and links mounted upon the pivots and connected to the pins for effecting movements of the racks tangentially of the pinion as the pins are rotated angularly.

4. A mechanical movement comprising a hollow driving member having a guideway extending radially thereof, a driven pinion positioned in the guideway coaxially of the driving member, a plurality of racks in mesh with the pinion and positioned in the guideway for rotation with the driving member, a plurality of pins carried by the racks, the pins being disposed upon opposite sides of the axis of the pinion by equal distances, a plurality of pivots likewise disposed upon opposite sides of the axis of the pinion by equal distances, and links connecting the pins with the pivots for effecting movement of the racks tangentially of the pinion during rotation of the pins about the axis of the pinion.

5. A mechanical movement comprising a rotatable cage, a guideway in the cage extending radially thereof, a driven pinion positioned in the guideway, a plurality of racks slidably mounted in the guideway and continuously in engagement with the pinion, and means for moving the racks simultaneously in opposite directions inwardly or outwardly along the guideway as the cage is rotated, to effect variation in the velocity of angular movement of the pinion.

MARY B. JAMES.
*Administratrix of the Estate of Lester E. James, Deceased.*